Oct. 18, 1960 P. M. HAY 2,957,077
COATED COLLAPSIBLE TUBES
Filed June 15, 1955 4 Sheets-Sheet 1
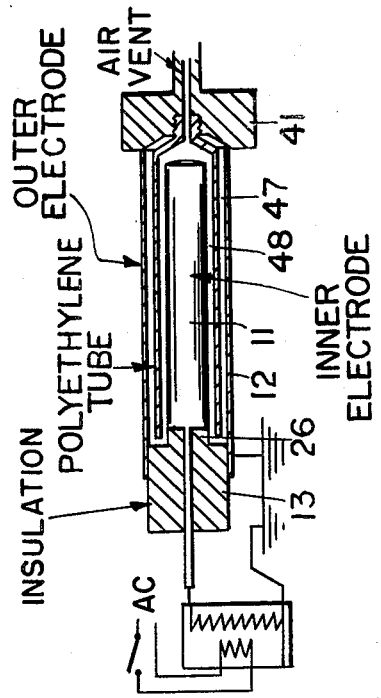
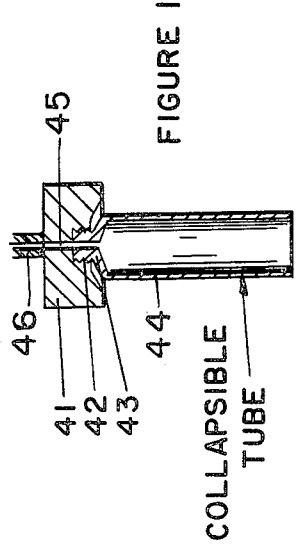
INVENTOR.
PETER. M. HAY
BY
*Stefan M Stein*
ATTORNEY

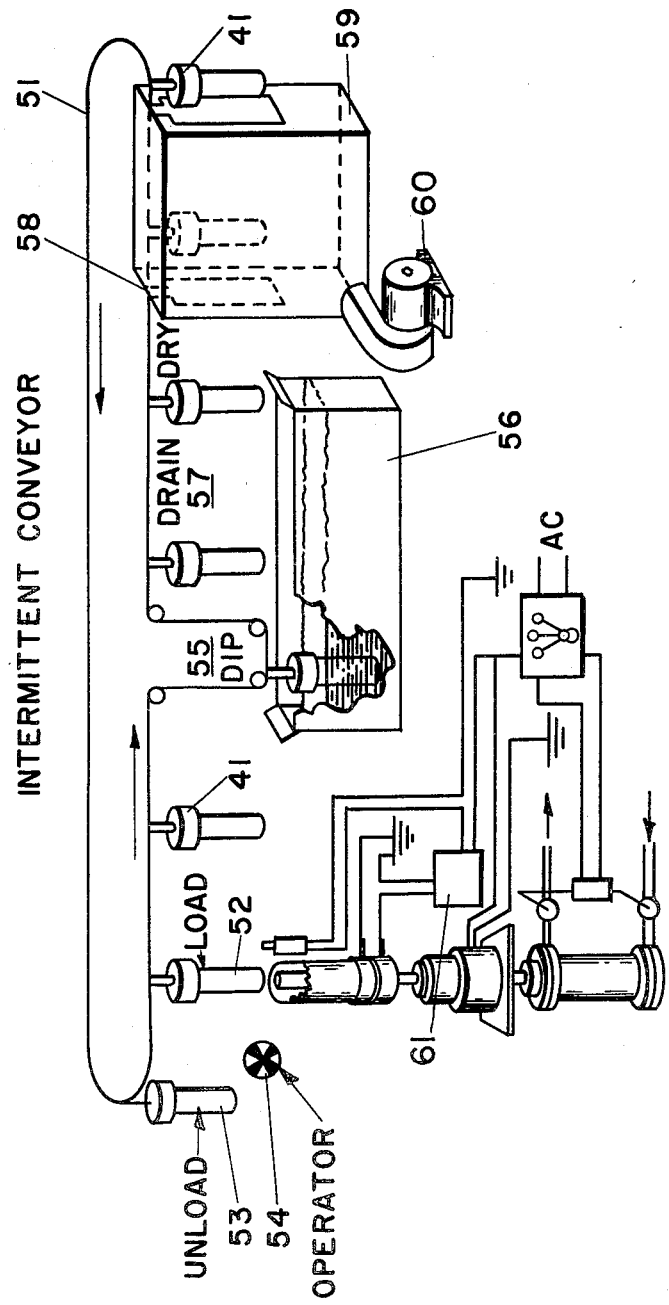

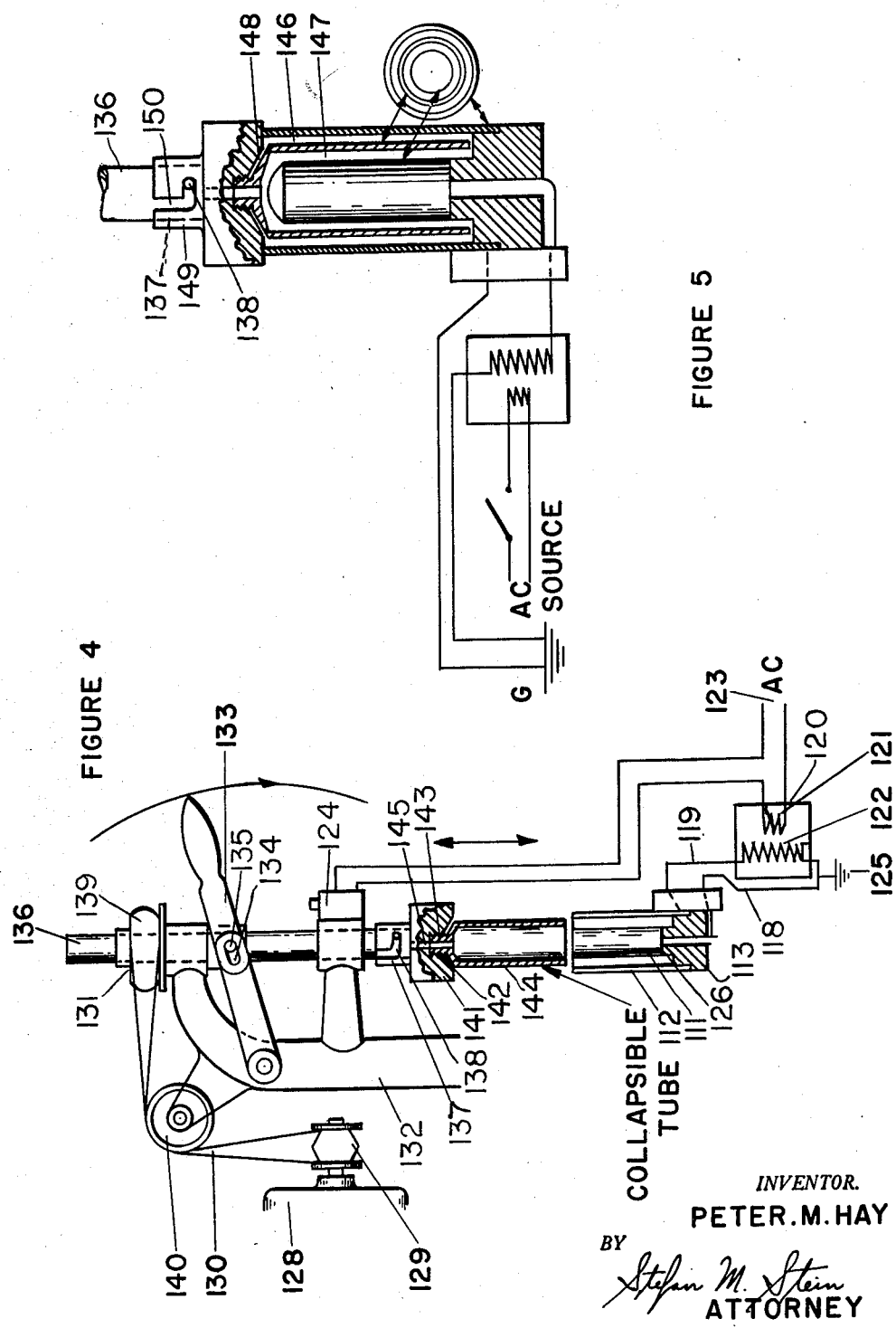

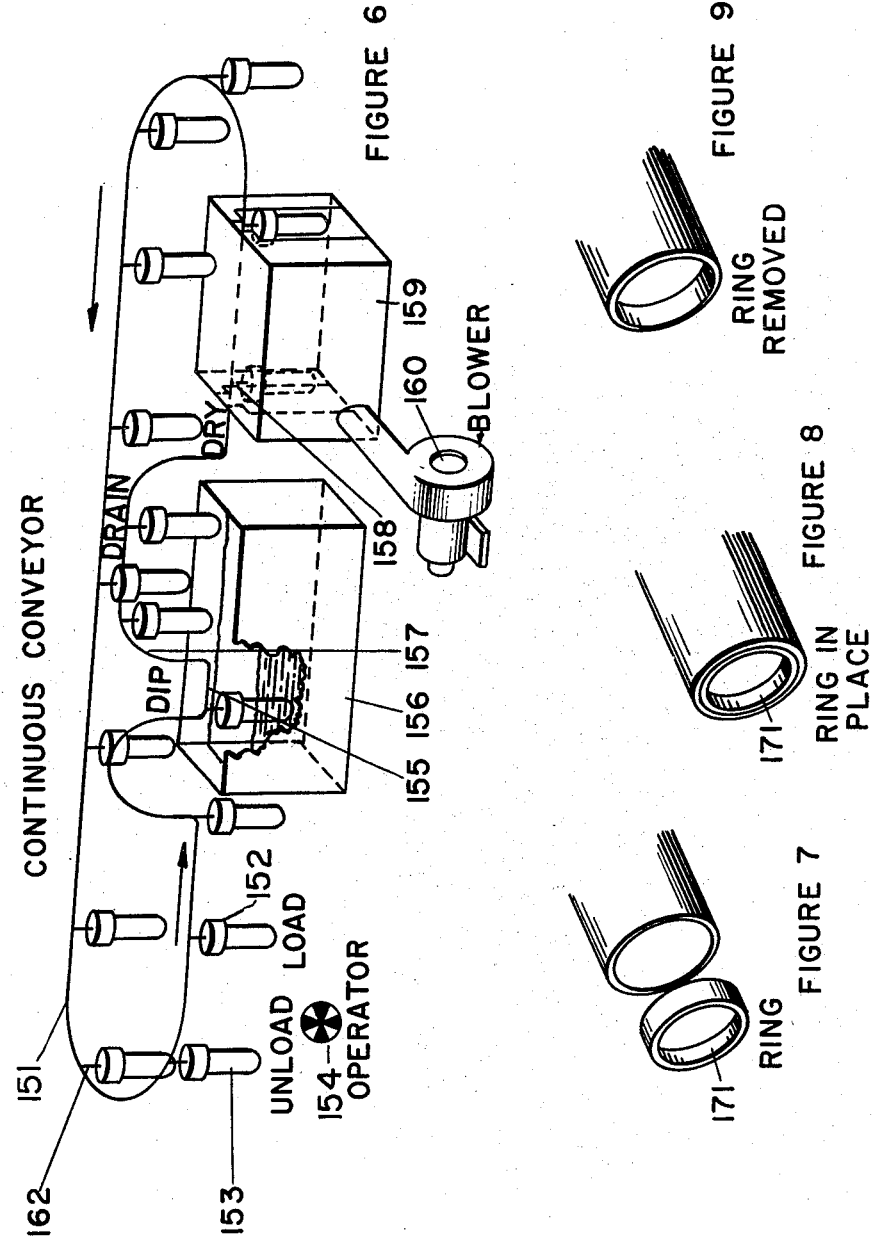

2,957,077
Patented Oct. 18, 1960

2,957,077

METHOD AND APPARATUS FOR PRODUCING COATED THERMOPLASTIC CONTAINERS

Peter M. Hay, East Haven, Conn., assignor, by mesne assignments, to American Can Company, New York, N.Y., a corporation of New Jersey Filed June 15, 1955, Ser. No. 515,638

15 Claims. (Cl. 250—49.5)

This invention relates to a novel method and apparatus for coating the inner and outer surfaces of collapsible tubes with an adherent coating and the product thereof. More particularly, this invention relates to a novel method and apparatus for first rendering the surfaces of polymeric collapsible tubes receptive to coatings such as printing inks, moistureproof or vaporproof coatings and the like, and then coating said structure with the desired coating and the product thereof.

The fabrication of plastic containers such as squeeze bottles, toothpaste tubes and the like resulted from the discovery that certain organic plastic materials such as polyethylene, nylon and the like have high tensile strength, good durability, are substantially inert to most chemicals and are relatively easy to fabricate into containers. Collapsible tubes such as toothpaste tubes and the like made of such polymeric material have been found to be particularly attractive in appearance while possessing the aforementioned desirable traits. But their use has heretofore been limited by inherent undesirable characteristics that certain polymers possess. For example, collapsible tubes made of polyethylene have not completely replaced the more expensive metallic collapsible tubes because although sufficiently durable and elastic for such use, the polyethylene is permeable to organic vapors, solvents and the like. It was, therefore, impossible to package ingredients which would permeate through the walls of the polyethylene structure.

In polyethylene film manufacture, this deficiency is rectified by coating the surface of the film with a vapor impermeable coating. In the case of polyethylene, its inertness prevented good adherence of the coating unless the film was pretreated with an electrical glow discharge, of the type disclosed in U.S. Patent 2,935,418. While the technique of this disclosure definitely improves the adherence of modifying coatings, its applicability to structures other than film is limited because the apparatus is not conducive to treatment of odd-shaped structures. A particular difficulty lies in pretreating the inside surface of bottles, tubes and the like. Coating of the inside is desirable to produce a container of plastic material whose walls are unaffected by and impermeable to the enclosed ingredients.

An object of this invention is to provide a method and apparatus for the pretreatment of collapsible polymeric tubing to improve its adherence to coatings. A further object of this invention is to provide a method and apparatus which is capable of pretreating the entire inside and outside surface of the said collapsible, polymeric tube to improve the adherence of coatings thereon. A still further object of this invention is to provide a method and apparatus for pretreating of collapsible, polymeric tubes which is adaptable for large scale production line use. Another object of this invention is to provide a continuous type method and apparatus for the inside and outside coating of polymeric collapsible tubing, which method and apparatus has a pretreating station therein. Other objects will become apparent to those skilled in the art upon reading the following detailed disclosure with accompanying drawings in which:

Figure 1 is a side view, partially in section perspective, of a collapsible tube pretreater illustrating an embodiment of this invention, Figure 2 is a side view of the electrode assembly and collapsible tube holder assembly in greater detail of the pretreater of Figure 1, Figure 3 is an illustration in perspective showing the pretreater of Figure 1 in use upon a coating conveyor system, Figure 4 is a side view partly in section perspective of another embodiment of the collapsible tube pretreater of this invention, Figure 5 is a side view of the electrode assembly and collapsible tube holder assembly in greater detail of the pretreater shown in Figure 4 in greater detail, Figure 6 is an illustration in perspective of a continuous conveyor system for use with the pretreater of Figure 4, Figure 7 is a perspective view showing the use of a masking ring around the inner surface of the base of the polyethylene tube for preventing coating of a short section of the end of the inside of the tube to allow for a subsequent weld closure, Figure 8 shows the ring of Figure 7 in place within the tube, Figure 9 shows the ring removed from the tube after the tube has been coated and dried.

The apparatus of this invention may be described, broadly speaking, as an inner metal electrode and an outer metal electrode spaced therefrom, into which a collapsible tube can fit with an air gap between it and both the inner and the outer electrodes. A high frequency, high level alternating voltage is then impressed across the gap between the electrodes and the tube is pretreated. It is subsequently coated. More particularly, the pretreating apparatus has an inner metal electrode and an outer metal tubular electrode, concentric with and spaced from said inner electrode, the space being of sufficient dimension for insertion of a collapsible tube with an air gap on each side, the collapsible tube being affixed to a holder which acts as a conductive electrode cap for the outer electrode. Subsequent impressing of high frequency, high level alternating voltage across the gap between the electrodes at values to produce a corona discharge at their surfaces causes not only a treatment of the side walls but also treatment of the closed end of the tube simultaneously with its side walls. The tube is then subsequently coated with a modifying coating.

Referring to the drawing in Figures 1, 2 and 3, there is shown an embodiment of the apparatus of this invention in which the electrode assembly moves into treating engagement with the vertically stationary collapsible tube holder assembly. In Figures 4, 5 and 6, another embodiment is shown in which the electrode assembly is stationary while the collapsible tube holder assembly is movable.

The embodiment shown in Figures 1 to 3 consists of an inner electrode 11 of either solid or tubular shape residing within and concentric to an outer electrode 12, of tubular shape, both electrodes being affixed to a base 13. This base is made of dielectric material and contains a circular inner electrode slip ring 14 and an outer electrode slip ring 15, in circuit with the inner electrode 11 and the outer electrode 12 respectively. The base also contains a step 26 therein which prevents treatment of the lower end of the collapsible tube so as to obtain a better seal. Inner electrode brush 16 and outer electrode brush 17 transmit current to these slip rings. The high frequency, high level alternating voltage, necessary for treatment of the plastic tube, is transmitted to these brushes by means of wires 18 and 19 from transformer 20 having a primary coil 21 and a secondary coil 22. The primary coil is in circuit with an A.C. source 23 and a switch 24. The secondary coil is grounded at 25.

The electrode assembly including the inner electrode, the outer electrode and the base is rotated by an electrical motor 31 having speed reducer 32 between it and the electrode assembly. This rotation, while not absolutely necessary, is, nevertheless, desirable because treatment will be more uniform. A pneumatic system consisting of a vertically movable air piston 33 within an air cylinder 34, causes vertical movement of the motor and the electrode assembly. Air line 35 supplies air to the system. Air valve 36 controls the operation of the pneumatic assembly. When operated with the intermittent coating conveyor of Figure 3, the valve is controlled by the conveyor controller 61 to coordinate the upward movement of the electrode assembly when the conveyor is on the stop stroke of its intermittent operation.

The tube holding assembly consists of a tube holder 41 having an annular threaded cavity 42, into which the threaded spout 43 of the collapsible tube 44 is inserted. The cavity 42 may also have other tube-gripping means, such as a wedge, a chuck, or the like depending upon the spout of the tube being treated. The holder also contains an air vent 45 which communicates the volume enclosed by the collapsible tube with the outer atmosphere. Tube holder 41 is made of electrically conductive material so that upon contact with the outer electrode 12, it becomes an extension of said electrode. Its cavity 42 is designed so that the closed end of the tube is distant from the holder 41. With such an air gap, and in cooperation with the inner electrode also having an air gap, the current transmitted to the holder through the outer electrode will cause a treatment of the closed end both on its inner and outer surfaces. A conveyor connector 46 extends from the top side of the holder. It is made of dielectric material and insulates the electrodes from the conveyor. When the holder 41, with the downward extending collapsible tube is inserted into the space between the inner electrode 11 and the outer electrode 12, the walls of the collapsible tube are intermediate the inner surface of the outer electrode and the outer surface of the inner electrode. An outer electrode air gap 47, an inner electrode air gap 48 and a holder air gap as discussed above, therefore, surrounds the tube.

The conveyor system shown (Figure 3) consists of a conveyor belt 51 having holders 41 spaced evenly about its circular or other desirable path. It has a load station 52 and an unload station 53 where an operator 54 can both load and unload the conveyor. At dip station 55, the conveyor dips the collapsible tube into a dip tank 56 containing a suitable coating composition. Drain station 57 permits drainage of the coating composition. The coated collapsible tube then passes through a dryer station 58 having a dryer 59 and a blower 60 which blows hot dry air into the dryer chamber. The tubes after being dried are removed at the unload station 33.

The conveyor of Figure 3 is operated by first threading a collapsible tube 44 into one of the holders 41 which hangs from the conveyor line. The conveyor is started and by conveyor controller 61 the air valve 36 of the pretreater assembly is opened. Air piston 33 is driven upwardly by air under pressure entering into air cylinder 34. The inner and outer electrodes 11 and 12 as well as the motor assembly 31 and 32, in turn are driven upwardly while said electrodes are being rotated by said motor. When the holder 41 touches the top lip surface of the outer tube, the switch 24 is closed by either being mechanically activated by the holder 41 or operated by conveyor controller 61 and high frequency, high level alternating voltage is impressed across the gap between the electrodes at values to produce a corona discharge at their surfaces to treat the collapsible tube both on its inner and outer wall and end closure surfaces. After a period of time sufficient to treat the surfaces air pressure relief valve 37 is opened, and the current to the electrodes is turned off. The motor as well as the electrode assembly drops. The conveyor is then started and another holder is positioned above the electrode assembly which in turn is treated in the pretreater. Intermittent operation of the conveyor thus takes place.

The embodiment shown in Figures 4 through 6 includes a continuous conveyor system and a pretreatment arrangement for use therewith. The pretreatment assembly consists of an assembly separate from the conveyor line. It has an inner electrode 111 of tubular or solid bar shape and an outer tubular electrode 112 both affixed to a base 113 which consists of dielectric material. It also contains a step 126 therein which prevents treatment of the lower end of the collapsible tube so as to obtain a better seal. Insulated wires 118 and 119 connect inner electrode 111 and outer electrode 112 respectively to the secondary coil 122 of a transformer 120. Primary coil 121 of the transformer is in circuit with an A.C. source 123 and a switch 124 operated by lever 133 of the drill press assembly. The secondary coil circuit is grounded at ground 125.

A drill press type assembly 131 having stock 132 and pivotable lever 133 is used to insert collapsible tubes between the electrodes. The lever contains an elongated slot 134 into which extends lug 135 of a shaft 136. The chuck section 137 of the shaft 136 has a lug 138 thereon for engagement with the L shaped slot 150 of the tube holder of the assembly. The shaft is driven by motor 128 through belt 130 rotating about motor spindle 129, pulley 140 and shaft spindle 139.

The tube holder assembly 141 consists of a block of electrically conductive material which has a threaded annular cavity or orifice 142 on its undersurface into which the threaded spout 143 of the collapsible tube 144 can be inserted. The threaded cavity is of such depth that the outer surface of the collapsible tube will, when the spout is fully engaged, be at a predetermined distance from said block. Air vent 145 communicates the space enclosed by the collapsible tube 144 with the outer atmosphere. When the collapsible tube 144 is inserted into the area between the inner electrode 111 and the outer electrode 112, an outer electrode air gap 146 and an inner electrode air gap 147 is present. As discussed above, there is also a holder air gap 148 between the top surface of the collapsible tube 144 and the holder 141. These air spaces are necessary for the pretreatment of both the inner and outer surfaces of the side walls and end closure of the collapsible tube. The holder has a tubular connector 149 extending vertically upward from its upper surface. The aforementioned L shaped slot 150 is present on its upper lip for engagement by lug 161 of the conveyor hanger 162.

The conveyor system (Figure 6) consists of a conveyor belt 151 having conveyor hangers 162 spaced evenly about its circular or other desirable path. It has a load station 152, and an unload station 153 where an operator 154 can both load and unload the conveyor. At dip station 155 the conveyor dips the collapsible tube 144 into a dip tank 156 containing a suitable coating composition. Drain station 157 permits drainage of the coating composition. The coated collapsible tube then passes through a dryer station 158 having a dryer 159 and a blower 160 which blows hot dry air into the dryer chamber. The tubes after being dried are removed at the unload station 153.

The pretreater of Figure 4 is operated by first threading a collapsible tube 144 into the tube holder 141. The tube holder is then secured to shaft 136 of the drill press type treating assembly by engaging lug 138 of the shaft 136 with the L shaped slot 150 of the holder.

Motor 128 is started and the holder 141 is rotated through motor spindle 129, belt 130 and shaft spindle 139. Lever 133 is depressed, thereby inserting collapsible tube in the space enclosed by but removed from electrodes. A high frequency, high level alternating voltage is then impressed across the gap between the electrodes at values to produce a corona discharge at their surfaces by closing switch 124 for a predetermined length of time depending upon the air gap between the surface of the electrodes and the tube. The closing of the switch 124 can be made automatic by the mechanical action of the downward descending holder 141 or with the use of a separate controlling switch operated by the lever 133. After treatment the lever is pivoted upwardly to turn off the current and lift the tube holder. The tube holder into which the tube has been threaded is then removed from the shaft. It is then placed upon the continuous conveyor system shown in Figure 6. The conveyor then passes the treated tube through a coating bath and a dryer to coat the surfaces of said tube. The holder and tube are removed at the unload station 153, and the tube 144 threadably disengaged from the holder 141.

In pretreating polymeric material with an electric discharge treatment it has been found that the pretreatment as well as the coating decreases the heat sealability of the polymeric material. Provision for preventing pretreatment of the inner surface of the collapsible tube has been made by the step in the base of each embodiment of the pretreater shown. To prevent coating of the inner surface, the tube, after it has been treated in the pretreater is provided with a ring 171 which fits into the lower opening of the tube, as shown in Figure 7. It is of a dimension sufficiently large to fit within the tube and be retained by the gripping force of the slightly stretched lip portion of said tube. Figure 8 shows the ring in place and Figure 9 shows the tube after it has been passed through the coating and drying bath. These provisions provide for an area that is untreated and uncoated on the inner surface of the tube and upon subsequent flat seam welding of the tube, a good weld results.

To prevent undue deposition of coating material upon the ring, it should preferably be made of a material which is unaffected by the coating composition. Polytetrafluoroethylene is admirably suited for such a purpose. Obviously, other materials such as hard rubber, stiff vinyl sheeting, and the like also are of use.

While the pretreater and coating assembly has been shown for operation upon collapsible tubes made of polyethylene, tubes made of other polymeric material such as polycaprolactam, polyesters, polytrichlorofluoroethylene and the like could obviously be treated. Also structures other than collapsible tubes, such as bottles without the bottom closure, could be treated.

The high-frequency, high level alternating voltage has been found to be most effective when in the range of 3,000 to 22,000 volts at a frequency in the range of about 500–17,500 cycles per second. Current flow occurring in the electrode circuit should be about 0.0015 to 0.125 ampere. The air gap between the surfaces of the collapsible tube and the electrodes should preferably be about 0.01 to 0.03 inch. The time of treatment should be less than about 0.01 second although higher residence time may sometimes be required.

Obviously, modifications can be made in the pretreater and coating assembly of this invention by those skilled in the art without departing from the spirit and scope of the invention described herein.

The invention having thus been described, what is desired to be secured by Letters Patent is as follows:

1. An apparatus for treating open collapsible tubes having an end closure with a threaded spout extending therefrom comprising an intermittent conveyor, a tube holder having a threaded orifice on its undersurface for holding said collapsible tube by its threaded spout, means extending from the upper surface of the holder for connecting the same to the conveyor, an air vent extending from said orifice through said holder, a tube-insertable cylindrical electrode, a tubular electrode for encompassing the outer side walls of said collapsible tube, a base of insulating material for supporting said electrodes and for separating them by a defined distance, revolving means for said base and said electrodes, lifting means for said base and said electrodes for inserting the walls of the tube, via the open tube end, into the space enclosed by said electrodes and spaced therefrom, and electrical means for passing high frequency, high level alternating voltage across the gap between said electrodes at values to produce a corona discharge at their surfaces.

2. An apparatus for treating open collapsible tubes having an end closure with a threaded spout extending therefrom comprising an intermittent conveyor, a tube holder of electrical conducting material having a threaded orifice on its undersurface for holding said collapsible tube by its threaded spout means extending from the upper surface of the holder for connecting the same to the conveyor, an air vent extending from said orifice through said holder, a cylindrical bar tube-insertable inner electrode, a tubular outer electrode for encompassing the outer side walls of a collapsible tube, a base of insulating material for supporting said electrodes in a vertically parallel relationship and for separating them by a defined distance, said base having two slip rings each in circuit with one of said electrodes, controllable revolving means for said base and said electrodes, lifting means for said base and said electrodes controllable by operation of an intermittent conveyor upon which said holder is secured, said lifting means for inserting the walls of the tube fastened to the holder, via the open tube end, into the space enclosed by said electrodes and spaced therefrom and to a depth sufficient for electrical contact of said holder with said other electrode, and electrical means including brushes for said holder slip rings for impressing high frequency, high level alternating voltage across the gap between said electrodes at values to produce a corona discharge at their surfaces.

3. An apparatus for treating open collapsible tubes having an end closure with a threaded spout extending therefrom comprising a tube holder having a threaded orifice on its undersurface for holding said collapsible tube by its threaded spout, an operating means connector extending from its upper surface and an air vent extending from said orifice through said holder, a tube-insertable cylindrical electrode, a tubular electrode for encompassing the outer side walls of said collapsible tube, a base of dielectric material for supporting said electrodes and for separating them by a defined distance affixed to the table of a drill press assembly, said drill press assembly having its drill shaft adapted to secure said tube holder and to lower a tube carried thereby, via its open end, into the space enclosed by said electrodes, and electrical means for passing high frequency, high level alternating voltage across the gap between said electrodes at values to produce a corona discharge at their surfaces.

4. An apparatus for treating open collapsible tubes having an end closure with a threaded spout extending therefrom comprising a drill press assembly having a drill shaft and a table, a tube holder of electrically conductive material having a threaded orifice on its undersurface for holding said collapsible tube by its threaded spout at a predetermined distance from said holder and with its open end downwardly disposed, an upward extending tubular shaped operating means connector of insulated material with a locking slot on its upper lip portion secured to the top surface of said holder and an air vent extending from said orifice through said holder, a cylindrical bar tube-insertable inner electrode, a tubular outer electrode for encompassing the outer side walls of said collapsible tubes, a base of dielectric material for supporting said electrodes in a vertically parallel relationship and for separating them by a defined distance affixed to said table and so placed as to hold the electrodes in alignment with the drill shaft, said drill shaft being of a dimension to fit, and having a locking lug on its lower portion for insertion into and locking reception by, the operating means connector, and electrical means for passing high frequency, high level alternating voltage across the gap between said electrodes at values to produce a corona discharge at their surfaces.

5. An apparatus for treating open thermoplastic tubes having an end closure with a spout extending therefrom comprising a tube holder with a spout gripping means for holding said collapsible tube by its spout with the open end extending away from the holder, an electrode assembly comprising a tube-insertable electrode having an outer diameter slightly less than the inner diameter of a tube to be treated, a tube-encompassing electrode spaced therefrom a distance slightly greater than the thickness of a tube to be treated and defining therewith a restricted annular space substantially matching the dimensions of the thermoplastic tube, and means at the ends of said electrodes remote from said tube holder for supporting the electrodes in said spaced relation with an open end of said annular space directed towards said tube holder, means providing relative axial movement between said holder and said electrode assembly for inserting the wall of the collapsible tube, via the open tube end, into said space to position the tube wall therein at a small radial distance from one of said electrodes, or for withdrawing the tube therefrom, and electrical means for impressing high level alternating voltage across the gap between said electrodes at values to produce a corona discharge at their surfaces.

6. An apparatus for operating upon open thermoplastic tubes having an end closure with a spout extending therefrom comprising an intermittently operating conveyor system having a station for treating the tubes, said conveyor having a transport device and equidistantly spaced tube holders each with a spout gripping means on its undersurface for holding its collapsible tube by its spout with its open end extending downwardly, and a connector for each tube holding means extending from its upper surface and connecting with the under surface of said transport device, an electrode assembly at said tube treating station comprising a tube-insertable cylindrical electrode having an outer diameter slightly less than the inner diameter of a tube to be treated, a tubular electrode for encompassing the outer side walls of said collapsible tube spaced from the cylindrical electrode a distance slightly greater than the thickness of a tube to be treated and defining therewith a restricted annular space substantially matching the dimensions of the thermoplastic tube, and means at the base ends of said electrodes for supporting the electrodes in said spaced relation with an open end of said annular space upwardly directed, means for causing relative axial movement between that holder which is located at the pretreating station and said electrode assembly to insert the wall of the tube carried by the latter holder, via the open tube end, into said space to position the tube wall therein at a small radial distance from one of said electrodes while the conveyor system is stopped, and electrical means for impressing high level alternating voltage across the gap between said electrodes at values to produce a corona discharge at their surfaces.

7. An apparatus for treating surfaces of the thermoplastic walls of open end tubular containers for the reception of a surface coating; comprising means holding the container with its axis in a predetermined line; an outer electrode means for encompassing a container held in said holding means disposed coaxially therewith; an inner electrode means coaxial with said holder means and outer electrode means and arranged to provide between itself and the latter a small air gap; mechanism for reciprocating one of said means axially with respect to the other two means to bring said container, outer electrode means and inner electrode means into nested relation with said container disposed in said air gap, and to move certain of said means out of nested relation for placement and removal of a container; and means to impress a high level alternating voltage across the gap between said electrode means at values to produce a corona discharge in said air gap and treat a surface on a wall of said container.

8. An apparatus for treating the walls of hollow thermoplastic articles of predetermined size and shape for the reception of a surface coating comprising an inner electrode of a size and shape to substantially fit the interior of the article and arranged to be adjacent the inner surface of the wall of an article to be treated, an outer electrode of a size and shape to substantially fit the exterior of the article and arranged to be adjacent the outer surface of the wall of an article to be treated, at least one of said electrodes being so sized and disposed as to be spaced from its article wall surface a small predetermined distance substantially constant throughout the area to be treated, both of said electrodes being of a size and shape to lie at least adjacent all parts of the article to receive the surface coating, and means to impress a high level alternating voltage across the gap between the electrode surfaces at values to cause occurrence of corona discharge in the gap simultaneously over the whole area of the article to be treated.

9. An apparatus for treating the walls of cylindrical thermoplastic containers of predetermined dimensions for the reception of a surface coating comprising an inner cylindrical electrode substantially fitting the interior of the container and arranged to be adjacent the inner surface of the wall of a container to be treated, an outer encompassing cylindrical electrode substantially fitting the exterior of the container and arranged to be adjacent the outer surface wall of the container to be treated, at least one of said electrodes being so sized and disposed as to be spaced from its corresponding container wall surface a small predetermined distance substantially constant throughout the area to be treated, both of said electrodes being of a size and shape to lie adjacent substantially the entire surface area of the container, and means to impress a high level alternating voltage across the gap between the electrode surfaces at values to cause corona discharge in the gap whereby substantially the whole container area to be treated is simultaneously exposed to corona discharge.

10. A method for treating the walls of hollow thermoplastic articles for the reception of a surface coating comprising simultaneously approaching all of that area of the wall of the article to receive the surface coating with inner and outer electrodes, at least one of which is spaced slightly from the surface of the article, and impressing a high level alternating voltage across the gap between the electrode surfaces at values to cause occurrence of corona discharge in the gap, whereby to treat simultaneously all of said area on the surfaces where said electrode spacing exists.

11. A method for treating the walls of cylindrical thermoplastic containers for the reception of a surface coating comprising simultaneously approaching substantially all of the container wall with inner and outer electrodes, at least one of which is spaced slightly from the container, and impressing a high level alternating voltage across the gap between the electrode surfaces at values to cause occurrence of corona discharge in the gap, whereby to treat simultaneously substantially all of said container wall on the surfaces where said electrode spacing exists.

12. A method of treating a surface of thermoplastic walls of open end tubular containers for the reception of a surface coating, comprising holding a container with its axis in a predetermined line, providing a container wall encompassing electrode and an inner electrode disposed in concentric relation with said encompassing electrode and arranged to provide an electrode assembly having an air gap between said electrodes, placing the electrode assembly in alignment with the container to that side thereof presenting the open end, relatively shifting said container and said assembly axially of each other to enclose said container wall in said air gap between said electrodes, and impressing a high level alternating voltage between said electrodes at values to produce a corona discharge in said gap adjacent the surface of said container wall to be treated.

13. A method of treating a surface of thermoplastic walls of open end tubular containers for the reception of a surface coating, comprising positioning a hollow cylindrical container encompassing electrode adjacent the outer face of the container wall to be treated and positioning a cylindrical container insertable electrode within the container and adjacent the inner face of said wall, and producing an electrical corona discharge between said electrodes adjacent the container wall surface to be treated.

14. A method of treating a surface of thermoplastic walls of open end tubular containers for the reception of a surface coating, comprising enclosing a container in an encompassing electrode, providing a second electrode adapted to fit within said enclosed container and entering the same therein, and forming an electrical corona discharge between said electrodes over the entire container wall surface to be treated.

15. A method as claimed in claim 14 wherein the electrodes employed are substantially coextensive in length with the length of the container to be treated, and the electrical corona discharge is formed after the container is fully enclosed by the encompassing electrode and has the second electrode fully entered therein, whereby to treat simultaneously the full area of the container wall to be treated.

References Cited in the file of this patent

UNITED STATES PATENTS

| | | |
|---|---|---|
| 1,832,096 | Chaffee et al. | Nov. 17, 1931 |
| 2,049,940 | Barthel | Aug. 4, 1936 |
| 2,260,282 | Grint | Oct. 28, 1941 |
| 2,420,620 | Remington et al. | May 13, 1947 |
| 2,509,448 | Ransburg et al. | May 30, 1950 |
| 2,549,927 | Ransburg | Apr. 24, 1951 |
| 2,604,870 | Blood et al. | July 29, 1952 |
| 2,615,822 | Huebner | Oct. 28, 1952 |
| 2,668,134 | Horton | Feb. 2, 1954 |
| 2,715,077 | Wolinski | Aug. 9, 1955 |
| 2,730,068 | Reynolds et al. | Jan. 10, 1956 |
| 2,810,933 | Pierce | Oct. 29, 1957 |
| 2,811,131 | Lopenski et al. | Oct. 29, 1957 |

FOREIGN PATENTS

| | | |
|---|---|---|
| 517,503 | Belgium | Aug. 7, 1953 |
| 722,875 | Great Britain | Feb. 2, 1955 |